United States Patent
Du et al.

(10) Patent No.: US 6,522,042 B1
(45) Date of Patent: Feb. 18, 2003

(54) ANCHORING SYSTEM FOR INJECTION MOLDED MAGNETS ON A FLUX RING OR MOTOR HOUSING

(75) Inventors: Hung T. Du, Reisterstown; Earl M. Ortt, Bel Air; Robert J. Marcinkowski, Cockeysville; Brandon Verbrugge, Towson; Michael Kunz, Hampstead, all of MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 09/492,059

(22) Filed: Jan. 27, 2000

(51) Int. Cl.[7] ............................................. H02K 21/26
(52) U.S. Cl. ............................ 310/154.03; 310/154.08; 29/596
(58) Field of Search .................. 310/154.08, 154.03, 310/50, 91, 47, 42, 43, 40 MM, 156.12, 156.21, 26, 254; 29/596, 598; 148/300; 252/62.54

(56) References Cited

U.S. PATENT DOCUMENTS

| | | | | |
|---|---|---|---|---|
| 3,422,295 A | | 1/1969 | Parker | 310/92 |
| 4,227,105 A | * | 10/1980 | Kumakura | 310/153 |
| 4,260,916 A | | 4/1981 | Theissig | 310/50 |
| 4,309,815 A | | 1/1982 | Schmitt et al. | 29/596 |
| 4,327,346 A | * | 4/1982 | Tada et al. | 335/296 |
| 4,335,323 A | | 6/1982 | Kebbon et al. | 310/40 R |
| 4,464,595 A | * | 8/1984 | Hamano et al. | 310/154 |
| 4,547,758 A | * | 10/1985 | Shimizu et al. | 335/302 |
| 4,587,449 A | * | 5/1986 | West | 310/154 |
| 4,594,525 A | | 6/1986 | Stokes | 310/156 |
| 4,625,392 A | | 12/1986 | Stokes | 29/598 |
| 4,668,887 A | | 5/1987 | D'Argouges et al. | 310/154.14 |
| 4,683,393 A | | 7/1987 | Stokes | 310/156 |
| 4,757,603 A | | 7/1988 | Stokes | 29/597 |
| 4,795,932 A | | 1/1989 | Long | 310/154 |
| 4,801,834 A | | 1/1989 | Stokes | 310/261 |
| 4,850,100 A | | 7/1989 | Stokes | 29/596 |
| 4,873,461 A | * | 10/1989 | Brennan et al. | 310/47 |
| 4,877,986 A | * | 10/1989 | Shimizu | 310/153 |
| 4,881,988 A | * | 11/1989 | Bonser | 148/300 |
| 4,910,861 A | | 3/1990 | Dohogne | 29/598 |
| 4,973,872 A | | 11/1990 | Dohogne | 310/156 |
| 5,083,052 A | * | 1/1992 | Ochi | 310/64 |
| 5,121,021 A | * | 6/1992 | Ward | 310/154 |
| 5,160,867 A | | 11/1992 | Niemela | 310/154.09 |
| 5,201,111 A | | 4/1993 | Prohaska | 29/596 |
| 5,203,071 A | | 4/1993 | Niemela | 29/596 |
| 5,206,556 A | * | 4/1993 | Hayakawa | 310/154 |
| 5,216,306 A | | 6/1993 | Nakazawa et al. | 310/89 |
| 5,268,607 A | | 12/1993 | McManus | 310/89 |
| 5,315,191 A | * | 5/1994 | Suzuki | 310/40 MM |
| 5,500,994 A | * | 3/1996 | Itaya | 29/598 |
| 5,528,095 A | | 6/1996 | Strobl | 310/156 |
| 5,584,114 A | | 12/1996 | McManus | 29/596 |
| 5,679,994 A | | 10/1997 | Shiga et al. | 310/154.12 |
| 5,861,695 A | * | 1/1999 | Brassard | 310/154 |
| 5,881,446 A | | 3/1999 | Shiga et al. | 29/596 |
| 5,895,026 A | | 4/1999 | Linkner, Jr. et al. | 251/129.15 |

FOREIGN PATENT DOCUMENTS

| | | | | |
|---|---|---|---|---|
| DE | 321007 | | 1/1919 | |
| DE | 1613011 | | 10/1970 | |
| DE | 2155752 | | 5/1973 | |
| DE | 2535210 | | 2/1977 | |
| DE | 3036941 | | 4/1982 | |
| DE | 2622585 | | 4/1988 | |
| DE | 4401847 | | 7/1995 | |
| DE | 19524953 | | 1/1997 | |
| EP | 0186530 | | 10/1985 | |
| EP | 0496075 | | 11/1995 | |
| EP | 168743 A2 | * | 1/1996 | 310/254 |
| FR | 2617344 | * | 12/1988 | |
| FR | 2 617 345 | | 12/1988 | |
| JP | 36-8012 | | 4/1936 | |
| JP | 0286418 | * | 4/1984 | |
| JP | 0236276 | * | 7/1985 | |
| KR | 9305342 | * | 6/1993 | |

* cited by examiner

*Primary Examiner*—Joseph Waks
(74) *Attorney, Agent, or Firm*—Harness, Dickey & Pierce, P.L.C.

(57) ABSTRACT

A power tool includes a flux ring with an annular member. At least one molded magnet is received on the annular member. An anchor is on the annular member to retain the at least one magnet on the annular member. The anchor is unitarily formed with the annular member to receive the magnet.

46 Claims, 4 Drawing Sheets

ANCHORING SYSTEM FOR INJECTION MOLDED MAGNETS ON A FLUX RING OR MOTOR HOUSING

BACKGROUND AND SUMMARY OF THE INVENTION

The present invention relates to power tools and, more particularly, to motors for power tool flux rings with anchors to retain molded magnets on the flux ring.

In motor construction, the motor magnets must be retained on the housing or separate flux ring within the housing. Ordinarily, these magnets have been glued or adhered to the metallic ring or housing. In adhering the magnets to the metallic surface so that the magnets do not shift during use, various types of adhesives have been used. While some of the adhesives have been satisfactory, some adhesives work better than others. As the adhesives age, it is possible that if the power tool is dropped, that the sudden shock will destroy the bond between the magnet and the housing or ring, enabling the magnet to travel within the motor. When this occurs, the motor ceases to function. Thus, it would be desirable to provide a mechanism to retain the magnets in position on the ring or housing.

The present invention provides the art with a mechanism to retain magnets onto a flux ring or motor housing. Due to the advent of molded magnets, it is possible to provide an anchor in the flux ring or housing to retain the molded material on the ring or housing. One such anchoring member is an aperture having a counter-sink on the exterior of the ring or housing. Thus, when the magnet is molded onto the ring, the magnetic material that passes through the ring into the counter-sink forms a solid rivet-shaped fastener. Also, anchors may be stamped out of the ring or housing and project into the interior of the ring to receive the molded magnetic material. Due to the anchors being unitarily formed or stamped from the ring or housing, an aperture is left in the ring or housing after stamping, which is likewise filled with the molded magnetic material.

In accordance with a first aspect of the invention, a flux ring comprises an annular housing. At least one molded magnet is received on the housing. An anchor on the housing retains the at least one magnet on the annular housing. The anchor is unitarily formed with the housing. The annular housing is metal with the anchor projecting radially from the housing. The projecting anchor has an aperture immediate the anchor on the housing. Thus, the magnetic material molds around the anchor and into the aperture. The anchor may have several different shapes. Preferably, the anchor has a rectangular shape, with one or both ends connected to the housing. Also, the anchor may have an L- or T-shape with one end connected to the housing. Further, the anchor may have a truncated cone shape with an axial aperture through the cone.

In accordance with a second aspect of the invention, a flux ring comprises an annular housing with at least one molded magnet received on the housing. An anchor is on the housing to retain the at least one magnet on the annular housing. The anchor is unitarily formed with the housing wherein the anchor includes an aperture with the aperture having a counter-sink portion on an exterior surface of the housing. The molded magnet enters the aperture and forms a rivet-shaped member. The housing may include a second anchor projecting from the housing. The second anchor may have several different shapes. Preferably, the second anchor has a rectangular shape, with one or both ends connected to the housing. Also, the second anchor may have an L- or T-shape with one end connected to the housing. Further, the second anchor may have a truncated cone shape with an axial aperture through the cone.

In accordance with a third aspect of the invention, a motor comprises a stator assembly with the stator assembly including a flux ring. The flux ring comprises an annular housing. At least one molded magnet is received on the housing. An anchor on the housing retains the at least one magnet on the annular housing. The anchor is unitarily formed with the housing. The annular housing is metal with the anchor projecting radially inward from the housing. The projecting anchor has an aperture immediate the anchor on the housing. Thus, the magnet molds around the anchor and into the aperture. The anchor may have several different shapes. Preferably, the anchor has a rectangular shape, with one or both ends connected to the housing. Also, the anchor may have an L- or T-shape with one end connected to the housing. Further, the anchor may have a truncated cone shape with an axial aperture through the cone. Also, the motor comprises an armature rotatable within the stator assembly. A commutator is rotatable with the armature and connected to the armature via a shaft. A brush assembly is associated with the commutator.

In accordance with a fourth aspect of the invention, a power tool comprises a housing with a motor in the housing. The motor comprises a stator assembly with the stator assembly including a flux ring. The flux ring comprises an annular housing. At least one molded magnet is received on the housing. An anchor on the housing retains the at least one magnet on the annular housing. The anchor is unitarily formed with the housing. The annular housing is metal with the anchor projecting radially inward from the housing. The projecting anchor has an aperture immediate the anchor on the housing. Thus, the magnet molds around the anchor and into the aperture. The anchor may have several different shapes. Preferably, the anchor has a rectangular shape, with one or both ends connected to the housing. Also, the anchor may have an L- or T-shape with one end connected to the housing. Further, the anchor may have a truncated cone shape with an axial aperture through the cone. Also, the motor comprises an armature rotatable within the stator assembly. A commutator is rotatable with the armature and connected to the armature via a shaft. A brush assembly is associated with the commutator. Also, the power tool includes an output member coupled with the motor shaft. An actuator member is electrically coupled between the motor and the power source to energize and de-energize the motor. In turn, when the motor is energized, the output member rotates.

In accordance with a fifth aspect of the invention, a motor comprises a stator assembly. The stator assembly includes a flux ring comprising an annular housing with at least one molded magnet received on the housing. An anchor is on the housing to retain the at least one magnet on the annular housing. The anchor is unitarily formed with the housing wherein the anchor includes an aperture with the aperture having a counter-sink portion on an exterior surface of the housing. The molded magnet enters the aperture and forms a rivet-shaped member. The housing may include a second anchor projecting from the housing. The second anchor may have several different shapes. Preferably, the second anchor has a rectangular shape, with one or both ends connected to the housing. Also, the second anchor may have an L- or T-shape with one end connected to the housing. Further, the second anchor may have a truncated cone shape with an axial aperture through the cone. Also, the motor comprises an armature rotatable within the stator assembly. A commutator is rotatable with the armature and connected to the armature via a shaft. A brush assembly is associated with the commutator.

In accordance with a sixth aspect of the invention, a power tool comprises a housing with a motor in the housing. The motor comprises a stator assembly with the stator assembly including a flux ring, comprising an annular housing with at least one molded magnet received on the housing. An anchor is on the housing to retain the at least one magnet on the annular housing. The anchor is unitarily formed with the housing wherein the anchor includes an aperture with the aperture having a counter-sink portion on an exterior surface of the housing. The molded magnet enters the aperture and forms a rivet-shaped member. The housing may include a second anchor projecting from the housing. The second anchor may have several different shapes. Preferably, the second anchor has a rectangular shape, with one or both ends connected to the housing. Also, the second anchor may have an L- or T-shape with one end connected to the housing. Further, the second anchor may have a truncated cone shape with an axial aperture through the cone. Also, the motor comprises an armature rotatable within the stator assembly. A commutator is rotatable with the armature and connected to the armature via a shaft. A brush assembly is associated with the commutator. Also, the power tool includes an output member coupled with the motor shaft. An actuator member is electrically coupled between the motor and the power source to energize and de-energize the motor. In turn, when the motor is energized, the output member rotates.

Additional objects and advantages of the present invention will become apparent from the detailed description of the preferred embodiment, and the appended claims and accompanying drawings, or may be learned by practice of the invention.

DETAILED DESCRIPTION OF THE PREFERRED EMBODIMENT

Figure 1:
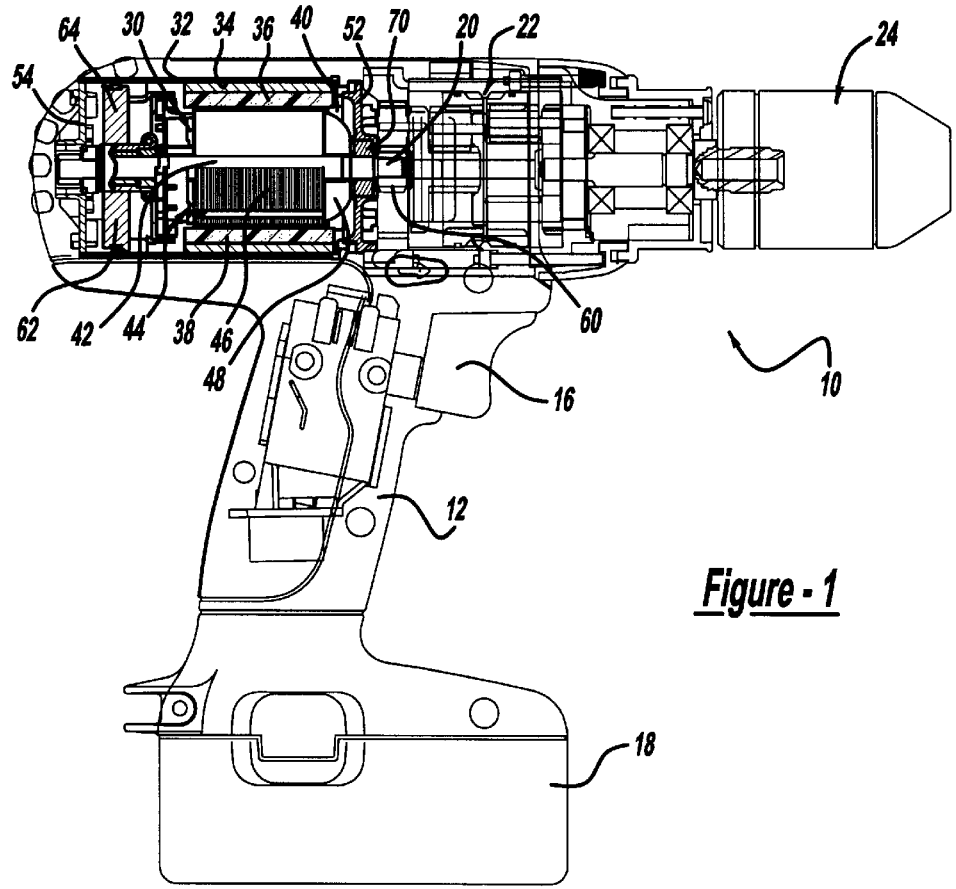
FIG. 1 illustrates a cross-section view of a power tool in accordance with the present invention.

Turning to FIG. 1, a power tool in accordance with the present invention is illustrated and designated with the reference numeral 10. The power tool 10 is illustrated as a drill; however, any type of power tool such as a screwdriver, sander, rotary tool, clippers, saw or the like which utilize an electric motor may be used with the motor of the present invention. The power tool 10 includes a housing 12 which surrounds a motor 14. An activation member 16 is coupled with the motor 14 as well as with a power source 18. The power source 18 may be a power cord (AC current) or the power tool may have a battery (DC current) as shown. The motor 14 is coupled with an output 20 which may include a transmission 22 and a chuck 24 to retain a tool (not shown) with the drill.

The motor 14 includes a stator assembly 30 which includes a housing 32, flux ring 34, and magnets 36 and 38. An armature 40 includes a shaft 42, a rotor 44 with laminations 46 and windings 48, as well as a commutator 50 coupled with the shaft 42. The motor also includes end plates 52 and 54. End plate 52 includes a bearing 56 which balances one end of the shaft 58 which is coupled with a pinion 60 which is part of the power tool output.

Brushes 62 and 64 which are associated with the commutator 50. A bearing 70 is also coupled with the end cap to balance rotation of the shaft 42.

Figure 2:
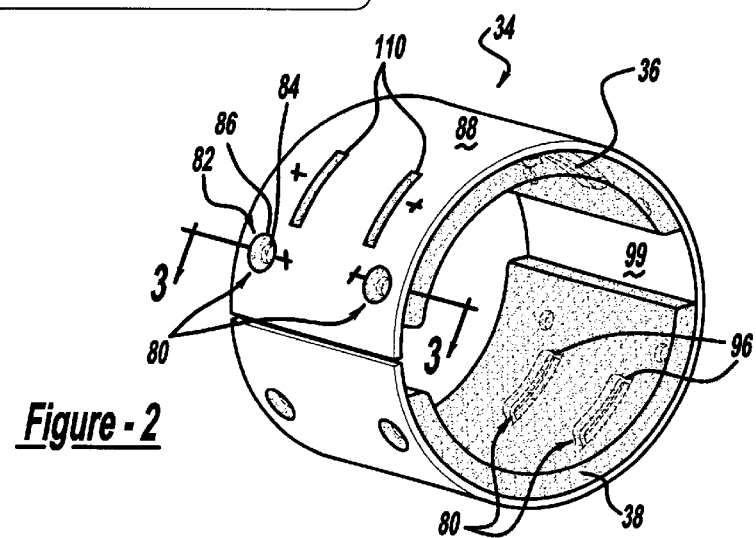
FIG. 2 illustrates a perspective view of a flux ring in accordance with the present invention.

Turning to FIG. 2, the flux ring 34 is illustrated with magnets 36 and 38. The magnets 36 and 38 are of a molded magnetic material. Preferably, the molded material is an injection molded material. The ring 34 is positioned within a die and the magnetic material is molded onto the flux ring. Also, the housing 32 may be used as the flux ring. Thus, the discussion with respect to the ring 34 may equally apply to the metallic housing 32 of the motor 14.

The flux ring 34 includes anchors 80 to retain the magnets 36 and 38 onto the ring 34. The anchors 80 may be of two types. First, anchor 82 is an aperture formed in the annular housing 34. The aperture 82 has a first portion 84 and a second counter-sink portion 86. The counter-sink portion 86 extends to the exterior 88 of the ring 34. Thus, as seen in the cross-section in FIG. 3, as the molded magnetic material is received in the aperture 82, the molded material has a neck 92 and a head 94. The head 94 and neck 92 provide an overall rivet appearance, thus the large head 94 acts to retain the magnet 36, 38 on the ring 34. The ring 34 may be comprised of just a plurality of aperture anchors 82 to retain the magnets on the ring 34.

Additional anchors 96 may be utilized on the ring. Anchors 96 project from the interior surface 98 of the ring 34. Ordinarily, the anchors 96 are stamped or the like into the ring 34 forming an aperture 100 immediately adjacent the projecting anchor 96. Thus, when the molded magnetic material forms around the projecting anchor 96, it likewise goes under the anchor 96 and fills in the aperture 100. This provides a firm securement for the magnet onto the ring 34.

Figure 4:
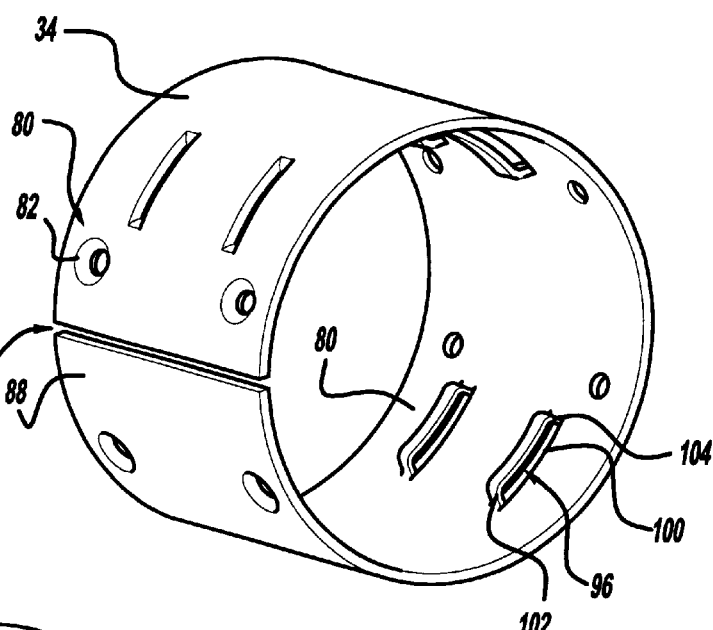
FIG. 4 is a perspective view of a flux ring like that illustrated in FIG. 2 with the magnets removed.

The ring 34 illustrated in FIG. 2 is illustrated in FIG. 4 without the magnetic material. As can be seen, the projecting anchor 96 has an overall rectangular shape with ends 102 and 104 unitarily formed with the ring 34. Likewise, the aperture anchors 82 are illustrated in FIG. 4. Also, aperture anchors 82 could be removed and only radially projecting anchors 96 would be used to retain the magnets on the housing.

Figure 3:
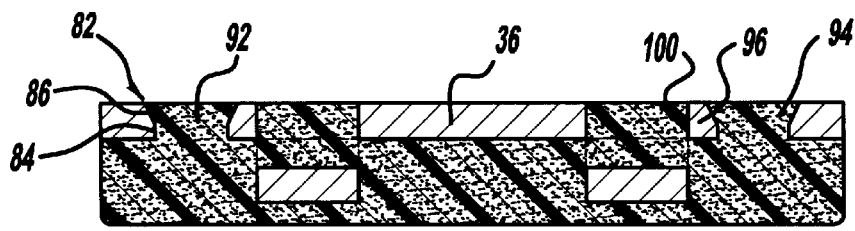
FIG. 3 is a cross-section view through FIG. 2 along line 3—3 thereof.
Figure 6:
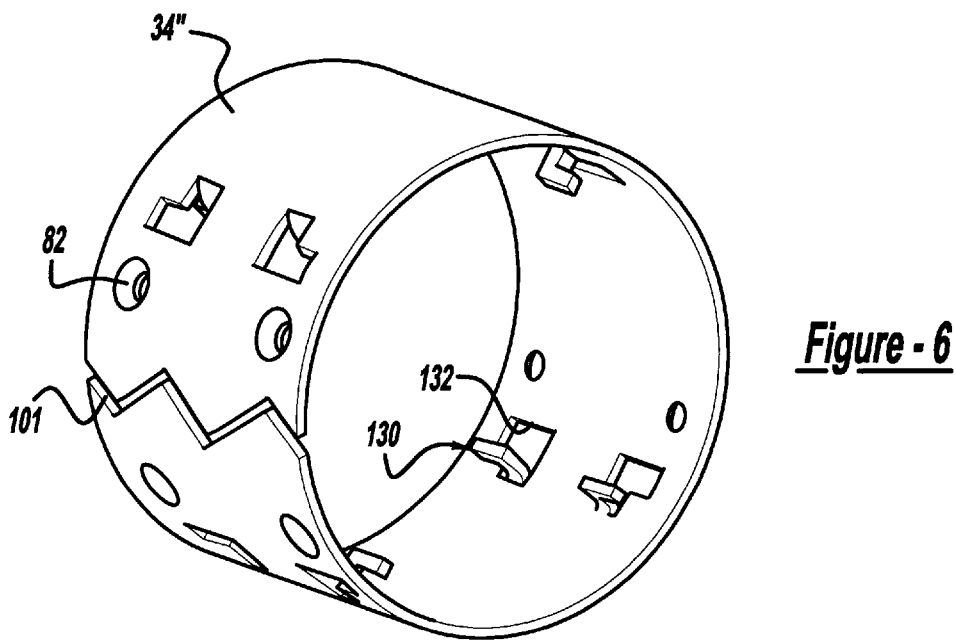

The rings 34 are ordinarily formed from a rectangular stamped sheet material. The rectangular shaped sheet metal is stamped to form the apertures 82 or the projecting anchors 96, or both, depending upon which anchoring system is desired. The flat sheet metal part is then rolled into an annular ring and may have a butt joint 99 (as shown), meshing end 101 (as seen in FIG. 6), or the like, forming the ring. The ring is then placed within a die where the magnetic material is injection molded onto the ring. The injection molded material moves through the apertures 82 and around the projecting anchors 96 as illustrated in FIG. 3. Then the ring is removed from the die, it is ready for insertion into the motor housing. Likewise, the motor housing itself could be utilized as the ring. In this case, the ring would not be present and the magnets would be molded directly onto the housing with the housing being formed as described.

Figure 5:
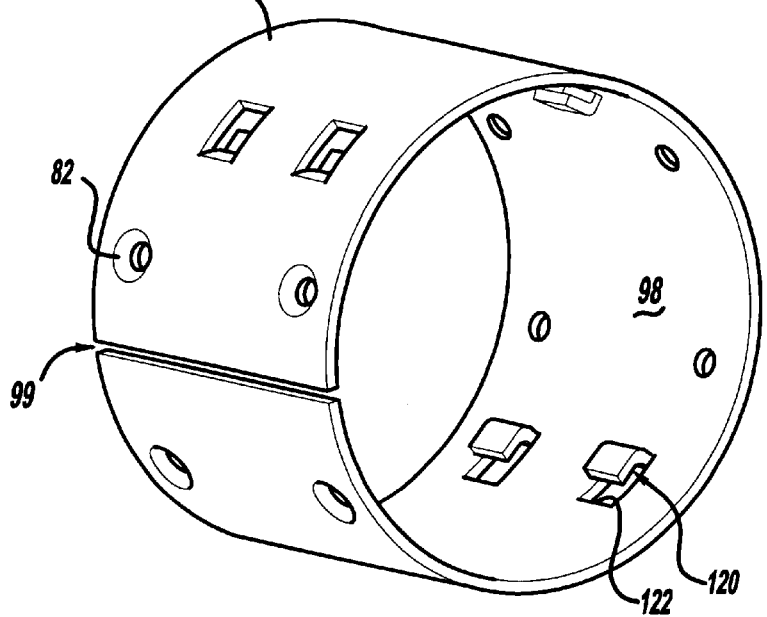
FIGS. 5–9 illustrate perspective views of additional embodiments of flux rings in accordance with the present invention.

Moving to FIGS. 5–9, additional embodiments of the present invention are illustrated. In FIG. 5, the flux ring 34' includes optional aperture anchors 82 like those previously described. Here, the projecting anchors 120 have an overall rectangular shape with one end secured to the ring 34'. Also, aperture 122 is immediately adjacent the projecting anchor 120.

Moving specifically to FIG. 6, another ring 34" is shown. Here, the ring 34" includes optional aperture anchors 82 like those previously described. Here, the projecting anchor 130 has an overall L-shape. The projecting L is secured at one end to the ring 34". The aperture 132 immediately adjacent the projecting L-shaped anchor 130 likewise has an L-shape.

Figure 7:
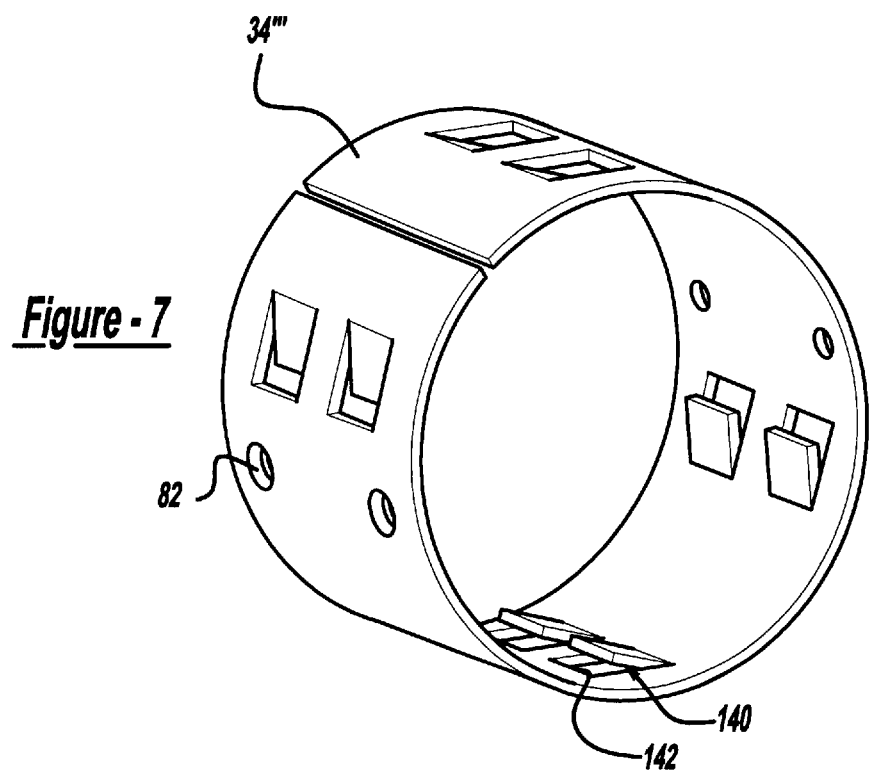

Turning to FIG. 7, an additional embodiment is shown. Here, the ring 34''' includes optional aperture anchors 82 like those previously defined, as well as projecting anchors 140. The projecting anchors 140 have an overall rectangular shape and are angled inward directly out of the ring 34'''. Also, the aperture 142 is immediately adjacent the projecting anchor 140.

Figure 8:
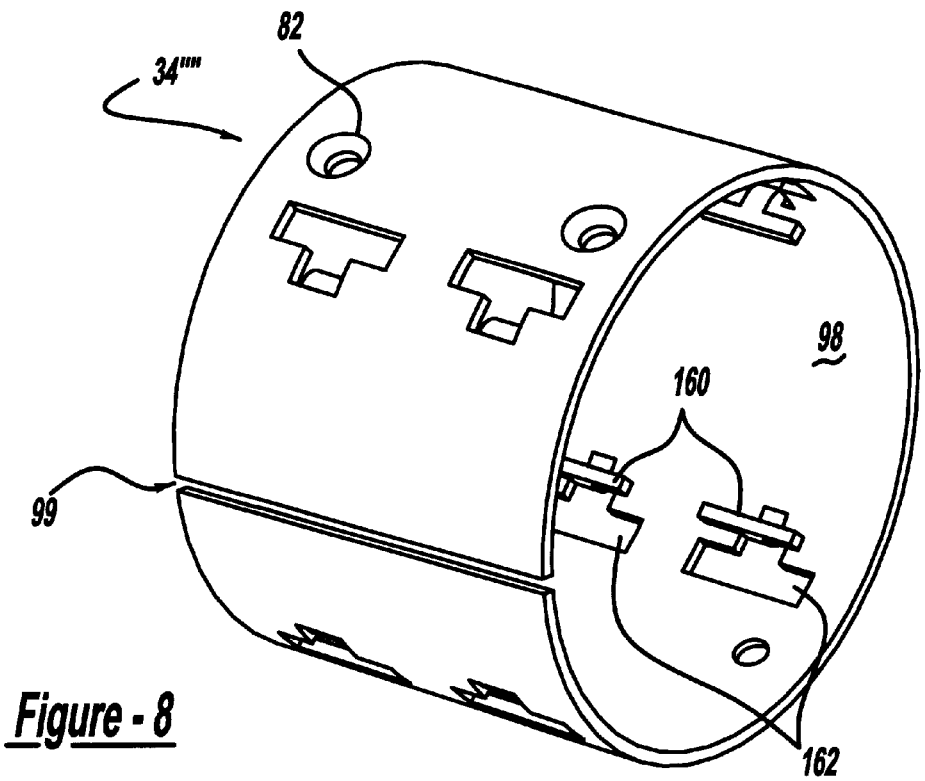

FIG. 8 illustrates an additional embodiment of the present invention. The flux ring 34"" includes optional aperture anchors 82 like those previously defined. The projecting anchors 160 have an overall T-shape. The apertures 162 immediately adjacent the T-shaped projecting member 160 likewise have a corresponding T-shape. Thus, as the magnetic material is molded onto the ring, the T-shaped projection 160 is covered by the magnetic material while the T-shaped aperture 162 receives magnetic material both holding the magnets in place on the ring 34"".

Figure 9:
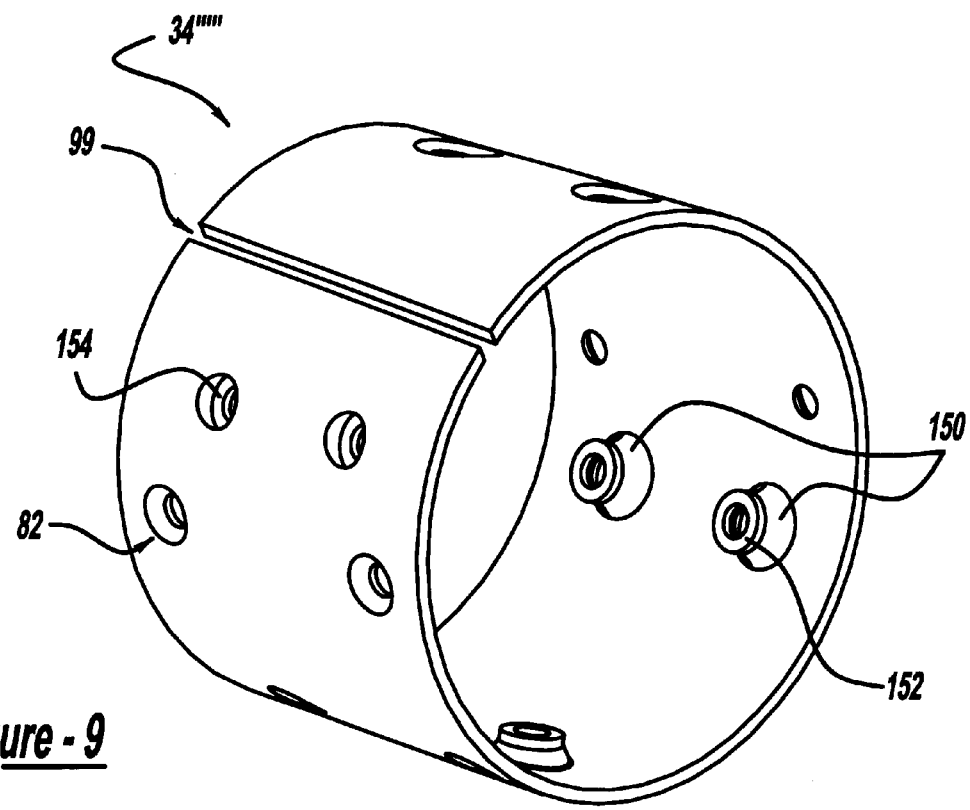

Turning to FIG. 9, an additional embodiment of the flux ring 34''''' is shown. Here, the flux ring includes optional aperture anchors 82 like those previously described. The projecting anchors 150 have a truncated cone shape. The truncated cones 150 include axial apertures 152. The axial apertures enable the molded magnetic material to move into the cone 154 formed on the exterior surface of the flux ring 34'''''.

While the above detailed description describes the preferred embodiment of the present invention, the invention is susceptible to modification, variation, and alteration without deviating from the scope and fair meaning of the subjoined claims.

What is claimed is:

1. A flux ring, comprising:
   an annular housing;
   at least one molded magnet received on said housing; and
   an anchor projecting from said housing receiving said molded magnet such that said molded magnet surrounds said anchor for retaining said at least one magnet against circumferential and radial movement on said annular housing, said anchor unitarily formed from said housing, such that an aperature is formed adjacent said anchor and said anchor including a first portion extending from said housing and a second portion extending from said first portion forming a bend between said first and second portions.

2. The flux ring according to claim 1, wherein said annular housing being a magnetically permeable metal.

3. The flux ring according to claim 2, wherein said anchor projects radially from said housing.

4. The flux ring according to claim 3, wherein said anchor is formed from said housing and providing an aperture immediate said anchor.

5. The flux ring according to claim 4, wherein said magnet molds around said anchor and into said aperture.

6. The flux ring according to claim 3, wherein said anchor has an overall rectangular shape with two first portions connected to said housing and bends between both first portions and said second portion.

7. The flux ring according to claim 6, wherein one of said first portion is connected to said housing.

8. The flux ring according to claim 3, wherein said anchor has an overall L-shape.

9. The flux ring according to claim 3, wherein said anchor has an overall T-shape.

10. The flux ring according to claim 3, wherein said anchor has a truncated cone shape.

11. The flux ring according to claim 10, wherein said truncated cone has an axial aperture.

12. A flux ring, comprising:
    an annular housing;
    at least one molded magnet received on said housing; and
    an anchor on said housing receiving said molded magnet for retaining said at least one magnet against circumferential and radial movement on said annular housing, said anchor unitarily formed with said housing;
    wherein said anchor includes an aperture, said aperture including a counter-sink portion on an exterior surface of said housing; and
    a second anchor projecting from said housing receiving said molded magnet such that said molded magnet surrounds said second anchor for retaining said at least one magnet against circumferential and radial movement, said second anchor unitarily formed from said housing such that an aperature is formed adjacent said second anchor and said second anchor including a first portion extending from said housing and a second portion extending from said first portion forming a bend between said first and second portions.

13. The flux ring according to claim 12, wherein said molded magnet enters said aperture, forming a rivet-shaped member.

14. The flux ring according to claim 12, wherein said second anchor is a portion of said housing and having an aperature immediate said second anchor.

15. The flux ring according to claim 14, wherein said magnet molds around said second anchor and in said aperature.

16. The flux ring according to claim 12, wherein said second anchor has an overall rectangular shape with two first portions connected to said housing and bends between both first portions and said second portion.

17. The flux ring according to claim 16, wherein one of said first portions is connected to said housing.

18. The flux ring according to claim 12, wherein said second anchor has an overall L-shape.

19. The flux ring according to claim 12, wherein said second anchor has an overall T-shape.

20. The flux ring according to claim 12, wherein said second anchor has a truncated cone shape.

21. The flux ring according to claim 20, wherein said truncated cone has an axial aperature.

22. A motor comprising:
    a stator assembly, said stator assembly including a flux ring comprising:
    an annular housing;
    at least one molded magnet received on said housing; and
    an anchor projecting from said housing receiving said molded magnet such that said molded magnet surrounds said anchor for retaining said at least one magnet against circumferential and radial movement on said annular housing, said anchor unitarily formed from said housing such that an aperature is formed adjacent said anchor and said anchor including a first portion extending from said housing and a second portion extending from said first portion forming a bend between said first and second portions;

an armature rotatable within said stator assembly;

a commutator rotatable with said armature and connected to said armature via a shaft; and brush assemblies associated with said commutator.

23. The motor according to claim 22, wherein said annular housing being magnetically permeable metal.

24. The motor according to claim 23, wherein said anchor is projecting radially inward from said housing.

25. The motor according to claim 24, wherein said anchor is a portion of said housing and having an aperature immediate said anchor.

26. The motor ring according to claim 25, wherein said magnet molds around said anchor and in said aperture.

27. The motor according to claim 24, wherein said anchor has an overall rectangular shape with two first portions connected to said housing and bends between both first portions and said second portions.

28. The motor according to claim 27, wherein one of said first portions is connected to said housing.

29. The motor according to claim 24, wherein said anchor has an overall L-shape.

30. The motor according to claim 24, wherein said anchor has an overall T-shape.

31. The motor according to claim 24, wherein said anchor has a truncated cone shape.

32. The motor according to claim 24, wherein said truncated cone has an axial aperature.

33. A power tool comprising:

a housing;

a motor in said hopusing, said motor comprising:

a stator assembly, said stator assembly including a flux ring comprising:

an annular housing;

at least one molded magnet received on said annular housing;

an anchor projecting from said annular housing receiving said molded magnet such that said molded magnet surrounds said anchor for retaining said at least one magnet against circumferential and radial movement on said annular housing, said anchor unitarily formed from said annular housing such that an aperature is formed adjacent said anchor and said anchor including a first portion extending from said housing and a second portion extending from said first portion forming a bend between said first and second portions;

an armature rotatable within said stator assembly;

a commutator rotatable with said armature and connected to said armature via a shaft;

brush assemblies associated with said commutator;

a power supply;

an output member coupled with said motor shaft; and an actuator memebr electrically coupled between said motor and said power source for energizing and de-energizing said motor which, in turn, rotates said output member when said motor is energized.

34. The power tool according to claim 33, wherein said annular housing being magnetically permeable metal.

35. The power tool according to claim 34, wherein said anchor is projecting radially inward form said annular housing.

36. The power tool according to claim 35, wherein said anchor is a portion of said annular housing and having an aperature immediate said anchor.

37. The power tool according to claim 35, wherein said anchor has an overall rectangular shape with two first portions connected to said annular housing and bends between both first portions and said second portion.

38. The power tool according to claim 37, wherein one first portion is connected to said annular housing.

39. The power tool according to claim 35, wherein said anchor has an overall L-shape.

40. The power tool according to claim 35, wherein said anchor has an overall T-shape.

41. The power tool according to claim 34, wherein said anchor has a truncated cone shape.

42. The power tool according to claim 41, wherein said truncated cone has an axial aperature.

43. A motor comprising:

an annular housing;

at least one molded magnet received on said housing;

an anchor on said housing receiving said molded magnet for retaining said at least one magnet against circumferential and radial movement on said annular housing, said anchor unitarily formed with said housing;

wherein said anchor includes an aperature, said aperature including a counter-sink portion on an exterior surface of said housing; and a second anchor projecting from said housing receiving said molded magnet such that said molded magnet surrounds said second anchor for retaining said at least one magnet against circumferential and radial movement, said second anchor unitarily formed from said housing such that an aperature is formed adjacent said second anchor and said second anchor including a first portion extending from said housing and a second portion extending from said first portion forming a bend between said first and second portions;

an armature rotatable within said stator assembly;

a commutator rotatable with said armature and connected to said armature via a shaft; and brush assemblies associated with said commutator.

44. The motor according to claim 43, wherein said molded magnet enters said aperature forming a rivet-shaped member.

45. A power tool comprising:

a housing;

a motor in said housing, said motor comprising:

a stator assembly, said stator assembly including a flux ring comprising:

an annular housing;

at least one molded magnet received on said housing;

an anchor on said housing receiving said molded magnet for retaining said at least one magnet against circumferential and radial movement on said annular housing, said anchor unitarily formed with said housing;

wherein said anchor includes an aperature, said aperature inlcuding a counter-sink portion on an exterior surface of said housing; and a second anchor projecting from said housing receiving said molded magnet such that said molded magnet surrounds said second anchor for retaining said at least one magnet against circumferential and radial movement, said second anchor unitarily formed from said housing such that an aperature is formed adjacent said second anchor and said anchor including a first portion enxtending from said housing and a second portion extending from said first portion forming a bend between said first and second portions;
an armature rotatable within said stator assembly;
a commutator rotatable with said armature and connected to said armature via a shaft;
brush assemblies associated with said commutator;
a power supply;

an output member coupled with said motor shaft; and
an actuator member electrically coupled between said motor and said power source for energizing and de-energizing said motor which, in turn, rotates said output member when said motor is energized.

46. The power tool according to claim 45, wherein said molded magnet enters said aperature forming a rivet-shaped member.

\* \* \* \* \*

UNITED STATES PATENT AND TRADEMARK OFFICE
CERTIFICATE OF CORRECTION

PATENT NO.    : 6,522,042 B1
DATED         : February 18, 2003
INVENTOR(S)   : Hung T. Du et al.

It is certified that error appears in the above-identified patent and that said Letters Patent is hereby corrected as shown below:

Column 5,
Line 52, "aperature" should be -- aperture --.

Column 6,
Lines 28, 41-42, 56 and 67, "aperature" should be -- aperture --.

Column 7,
Line 22, "portions" should be -- portion --.
Line 32, "aperature" should be -- aperture --.
Line 35, "hopusing" should be -- housing --.
Line 59, "memebr" should be -- member --.
Line 66, "form" should be -- from --.

Column 8,
Lines 3, 17, 26 (both occurrences), 45 and 59 (both occurrences) and 67, "aperature" should be -- aperture --.
Line 60, "inlcuding" should be -- including --.

Column 9,
Line 2, "enxtending" should be -- extending --.

Column 10,
Line 7, "aperature" should be -- aperture --.

Signed and Sealed this

Twenty-third Day of December, 2003

JAMES E. ROGAN
*Director of the United States Patent and Trademark Office*